United States Patent
Kim et al.

(10) Patent No.: US 11,449,781 B2
(45) Date of Patent: Sep. 20, 2022

(54) PLANT ABNORMALITY PREDICTION SYSTEM AND METHOD

(71) Applicant: DOOSAN ENERBILITY CO., LTD, Changwon-si (KR)

(72) Inventors: Hyun Sik Kim, Gimpo-si (KR); Jee Hun Park, Gwangmyeong-si (KR)

( * ) Notice: Subject to any disclaimer, the term of this patent is extended or adjusted under 35 U.S.C. 154(b) by 696 days.

(21) Appl. No.: 16/262,575

(22) Filed: Jan. 30, 2019

(65) Prior Publication Data

US 2019/0294988 A1 Sep. 26, 2019

(51) Int. Cl.
| | |
|---|---|
| *G06N 5/04* | (2006.01) |
| *G06N 20/20* | (2019.01) |
| *G06F 30/20* | (2020.01) |
| *G06F 16/9035* | (2019.01) |
| *G06F 17/15* | (2006.01) |
| *G06F 17/11* | (2006.01) |
| *G06F 111/10* | (2020.01) |

(52) U.S. Cl.
CPC .......... *G06N 5/048* (2013.01); *G06F 16/9035* (2019.01); *G06F 17/11* (2013.01); *G06F 17/15* (2013.01); *G06F 30/20* (2020.01); *G06N 20/20* (2019.01); *G06F 2111/10* (2020.01)

(58) Field of Classification Search
CPC ........ G06N 5/048; G06N 20/20; G06F 30/20; G06F 2111/10; G06F 16/9035; G06F 17/11; G06F 17/15
See application file for complete search history.

(56) References Cited

U.S. PATENT DOCUMENTS

2019/0188584 A1* 6/2019 Rao .................... G05B 19/4184

FOREIGN PATENT DOCUMENTS

| JP | 2017130081 A | 7/2017 |
|---|---|---|
| KR | 10-2009-0093174 A | 9/2009 |
| KR | 101096793 B1 | 12/2011 |

(Continued)

OTHER PUBLICATIONS

Rao et al., U.S. Appl. No. 62/607,809 Specification and Drawings, Provisional for US 2019/0188584, Dec. 2017. (Year: 2017).*

(Continued)

*Primary Examiner* — Kamran Afshar
*Assistant Examiner* — Marshall L Werner
(74) *Attorney, Agent, or Firm* — Harvest IP Law, LLP (57) ABSTRACT

A system and method predict whether a plant is abnormal by modeling a relationship equation between tags based on a correlation between the tags, applicable even if modeling is executed without understanding a target to abnormality determination, and implements internal early alarm logic based on a difference between measured data and predicted data over time. The plant abnormality prediction system includes a modeling information output unit including a pre-processing part for pre-processing past data received for a plurality of tags, a correlation analysis part for receiving the pre-processed data for each tag to determine an independent tag among the plurality of tags based on correlation coefficients for any two tags, and a modeling part for generating a relationship equation between the tags by using outputs of the pre-processing part and the correlation analysis part; and a prediction unit for calculating estimated data for the tag based on the relationship equation.

18 Claims, 7 Drawing Sheets

(56) References Cited

FOREIGN PATENT DOCUMENTS

KR   10-2017-0068144 A      6/2017
WO   WO-2019038283 A1 *    2/2019

OTHER PUBLICATIONS

A Korean Office Action dated Aug. 28, 2019 in connection with Korean Patent Application No. 10-2018-0033562 which corresponds to the above-referenced U.S. application.

* cited by examiner

PLANT ABNORMALITY PREDICTION SYSTEM AND METHOD

CROSS-REFERENCE TO RELATED APPLICATIONS

This application claims priority to Korean Patent Application No. 10-2018-0033562, filed on Mar. 23, 2018, which is incorporated herein by reference in its entirety.

BACKGROUND OF THE DISCLOSURE

Field of the Disclosure

The present disclosure relates to a system for predicting whether a plant is abnormal, and more particularly, to a plant abnormality prediction system, which may perform an accurate prediction by modeling a relationship equation between tags based on the correlation between the tags even if a modeling is executed in a state where the understanding for a target to abnormality determination is low.

Description of Related Art

A precise prediction model should be designed in order to reliably determine whether or not a system is abnormal. For example, an inaccurate model may be constructed when input tags and output tags for building the model are improperly chosen. Conventionally, tags without causation in the relationship are used to create a model which leads to an inaccurate prediction of an abnormality. In addition, input tags have been selected from, among a plurality of input tags, a sequence of tags that show similar variations over a period of time which may also lead to an inaccurate prediction.

In order to solve such a problem, it is necessary to analyze the correlation between the tags, to generate a group to exclude the tag having a very high correlation for each tag through a clustering operation, and to determine an independent tag based on the group.

In addition, it is necessary to perform the prediction through various algorithms according to whether or not it is an independent tag.

In addition, it is necessary to perform the prediction through various methods according to both (1) the difference between measured and predicted tag data and (2) whether or not the tag is independent.

SUMMARY OF THE DISCLOSURE

An object of the present disclosure is to implement internal early alarm logic for outputting an alarm signal based on a difference between measured data and predicted data according to the time for each tag.

Another object of the present disclosure is to implement a so-called ensemble based prediction method for performing the prediction for the tag through three methods according to the type of the tag and whether to output the alarm signal for each tag.

Still another object of the present disclosure is to implement a plant abnormality prediction system for performing an accurate prediction even when a person who insufficiently understands a system designs a prediction model.

Yet another object of the present disclosure is to analyze the correlation between the tags, to generate a group to exclude the tag having a very high correlation for each tag through a clustering operation, and to determine an independent tag based on the group.

Still yet another object of the present disclosure is to perform a prediction through various algorithms according to whether it is an independent tag for each tag.

Meanwhile, the objects of the present disclosure are not limited to the above-described technical objects, and may include various technical objects within a scope that is obvious to those skilled in the art from the following description.

According to one aspect of the present disclosure, there is provide a system for predicting plant abnormality. The system may include a modeling information output unit that includes a pre-processing part for pre-processing past data received for a plurality of tags, a correlation analysis part for receiving the pre-processed data for each tag to determine an independent tag among the plurality of tags based on correlation coefficients for any two tags among the plurality of tags, and a modeling part for generating a relationship equation between the tags by using outputs of the pre-processing part and the correlation analysis part; and a prediction unit for calculating estimated data for the tag based on the relationship equation.

The correlation analysis part may include a correlation coefficient calculation section for calculating the correlation coefficients for the any two tags among the plurality of tags; a relevant tag determination section for determining a relevant tag for each tag by comparing the correlation coefficient of the tag with a reference value; and an independent tag determination section for determining at least one tag among the plurality of tags as an independent tag based on the relevant tag. The relevant tag determination section may include a primary tag extractor for extracting a primary tag for each tag, the extracted primary tag being a tag wherein the absolute value of the correlation coefficient is not greater than a first upper limit and is not less than a first lower limit; a secondary tag extractor for extracting a secondary tag for each tag, the extracted secondary tag being a tag wherein the absolute value of the correlation coefficient is not greater than a second upper limit and is not less than a second lower limit; a tag remover for removing some tags from the extracted primary tags for each tag, the removed tags including at least one tag among the secondary tags; and a relevant tag number specifier for determining a set of relevant tags that has had removed some tags from the extracted primary tags for each tag, and for specifying a count of the relevant tags.

The prediction unit may include a model-based prediction part for calculating actually measured data for the plurality of tags and the estimated data for each tag based on the relationship equation; an internal early alarm part for outputting an alarm when the residual of the actually measured data and the estimated data for each tag is not less than a reference value; and an ensemble-based prediction part for re-calculating the estimated data for each tag based on the alarm for each tag. The ensemble-based prediction part may include a primary prediction section for outputting a k-NN-based predicted value when the tag is an independent tag by using as an input the estimated data for each tag output by the model-based prediction part; a secondary prediction section for outputting a k-NN-based predicted value when the tag is a dependent tag and is a tag in which an alarm has been output by using as an input the estimated data for each tag output by the model-based prediction part; and a tertiary prediction section for outputting one of a bagging-based predicted value and a boosting-based predicted value, when the tag is a dependent tag and is a tag in which an alarm has not been output by using as an input the estimated data for each tag output by the model-based prediction part.

According to another aspect of the present disclosure, there is provide a method for predicting plant abnormality. The method may include outputting modeling information that includes pre-processing past data received for a plurality of tags, analyzing a correlation by receiving the pre-processed data for each tag to determine an independent tag among the plurality of tags based on correlation coefficients for any two tags among the plurality of tags, and modeling by generating a relationship equation between the tags by using the pre-processing and the analyzing the correlation; and predicting by calculating estimated data for the tag based on the relationship equation.

The present disclosure is to implement internal early alarm logic for outputting an alarm signal based on a difference between the measured data and the predicted data according to the time for each tag.

The present disclosure is to implement an ensemble based prediction method for performing the prediction for the tag through three methods according to the type of the tag and whether to output the alarm signal for each tag.

The present disclosure is to implement a plant abnormality prediction system for performing an accurate prediction even when a person who insufficiently understands a system designs a prediction model.

The present disclosure is to analyze the correlation between the tags, to generate a group to exclude the tag having a very high correlation for each tag through a clustering operation, and to determine an independent tag based on the group.

The present disclosure is to perform a prediction through various algorithms according to whether it is an independent tag for each tag.

The effects of the present disclosure are not limited to the above-mentioned effects, and may include various effects within a scope that is obvious to those skilled in the art from the following description.

DESCRIPTION OF SPECIFIC EMBODIMENTS

The foregoing and further aspects are embodied through the embodiments described with reference to the accompanying drawings. It is to be understood that the components of each embodiment are capable of various combinations within the embodiments as long as they are not mutually exclusive or mutually contradictory. In addition, the present disclosure may be implemented in many various forms and is not limited to the embodiments described herein.

In order to clearly illustrate the claimed disclosure, parts not related to the description are omitted, and like parts are denoted by similar reference numerals throughout the specification. Then, it will be understood that when an element is referred to as "comprising" another element, the element is intended not to exclude other elements, but to further include other elements unless the context clearly indicates otherwise.

In addition, throughout this specification, when an element is referred to as being "connected" to another element, it may be "directly connected" to the other element or "electrically connected" to the other element with other elements interposed therebetween. In addition, in the specification, a signal means a quantity of electricity such as a voltage or a current.

As described in the specification, the term "unit" refers to "a block configured to change or plug-in the system of hardware or software," that is, a unit or a block that performs a specific function in hardware or software.

Figure 1:
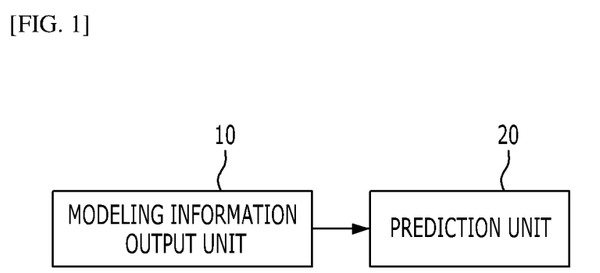
FIG. 1 is a block diagram of a plant abnormality prediction system according to an embodiment of the present disclosure.
Figure 2:
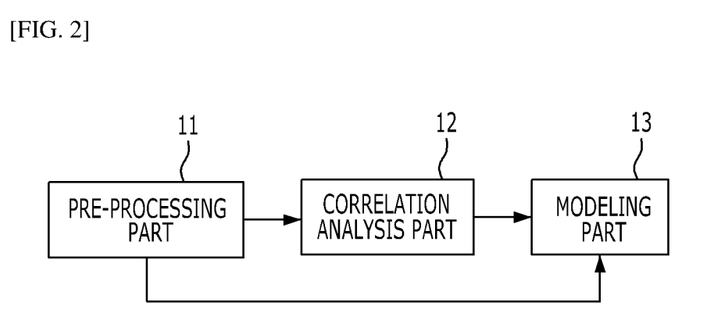
FIG. 2 is a block diagram of the modeling information output unit of FIG. 1.

FIG. 1 illustrates a plant abnormality prediction system according to an embodiment of the present disclosure, including a modeling information output unit 10 that is detailed in FIG. 2.

Referring to FIG. 1, a plant abnormality prediction system includes a modeling information output unit 10 for receiving (inputting) past data for a plurality of tags to generate a relationship equation between the tags; and a prediction unit 20 for calculating estimated data for the tag based on the relationship equation. Referring to FIG. 2, the modeling information output unit 10 of FIG. 1 includes a pre-processing part 11 for pre-processing the received past data for the plurality of tags; a correlation analysis part 12 for receiving the pre-processed data for each tag to determine an independent tag among the plurality of tags based on correlation coefficients for any one tag and another tag, that is, any two tags; and a modeling part 13 for generating the relationship equation between the tags by using as an input the outputs of the pre-processing part 11 and the correlation analysis part 12.

The past data inputted to the modeling information output unit 10 to generate the relationship equation between tags corresponds to a plurality of tags. Here, the tags are targets of the plant abnormality prediction and are also factors necessary for the prediction of the target. In practice, the tag is a variable that can be measured. For example, in the case of a plant, measurable variables may include one or more of temperature, humidity, a turbine's rotating speed, and steam pressure. Values of the tags vary over time, and any one tag may affect another tag.

The past data for the plurality of tags is a value of the tag at a point in time (time point) before the current time (current time point). The modeling information output unit 10 generates the relationship equation between the tags based on the past data for the plurality of tags.

The prediction unit 20 calculates the estimated data for the tag based on the relationship equation as calculated by the modeling information output unit 10. The estimated data for the tag is a value of the tag at a point in time after the current time. That is, the estimated data for the tag is a predicted value of the tag.

The pre-processing part 11 of the modeling information output unit 10 pre-processes the past data for the plurality of tags received by (inputted to) the modeling information output unit 10. That is, the pre-processing part 11 pre-processes, in real time, the value of a tag as the tag value varies over time. It may be understood that the pre-processing is to purify data and to remove noise included in the data.

Figure 3:
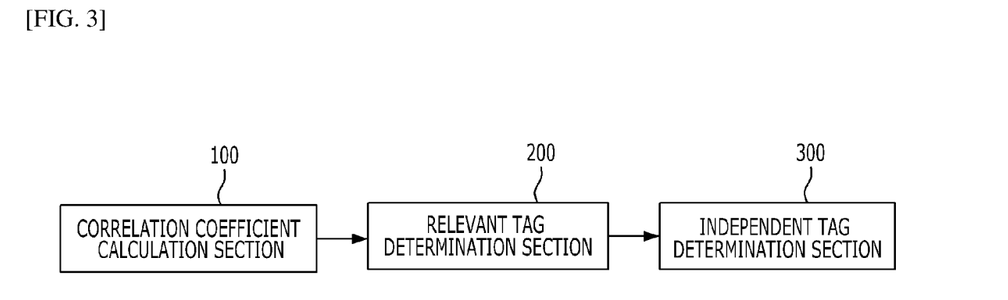
FIG. 3 is a block diagram of the correlation analysis part of FIG. 2.

A detailed procedure of determining the independent tag by the correlation analysis part 12 will be described later (FIG. 3).

The modeling part 13 uses the outputs of the pre-processing part 11 and the correlation analysis part 12 to generate a relationship equation between the tags. The below example of the relationship equation may be obtained by the modeling part 13.

$$y_{(k+m)} = a_1 x_{1(k)} + a_2 x_{2(k)} + \ldots + a_n x_{n(k)} + a_m$$

Here, y denotes an arbitrary tag, $x_1$ to $x_n$ denote tag values at a time point k, $a_1$ to $a_n$ denote coefficients, and $a_m$ denotes a constant. That is, the modeling part 13 generates the relationship equation in which any one tag is a weighted sum of the other tags. Since each of $x_1$ to $x_n$ is value of the tag for the time point k, the arbitrary tag y has a tag value of a time point k+m, where m is a progressing time factor equal to zero or more.

The plant abnormality prediction system determines the relevant tag for each tag and, for each tag, determines whether the tag is an independent tag or a dependent tag. Here, the relevant tag for any one tag is an input tag for predicting the any one tag. The plant abnormality prediction system may perform k-NN-based prediction, as an example, by using as an input the relevant tag for the tag determined as an independent tag. In addition, the plant abnormality prediction system may perform k-NN-based prediction, MLRM-based prediction, or ensemble-based prediction by using as an input the relevant tag for the tag determined as the dependent tag.

FIG. 3 illustrates a detailed configuration of the correlation analysis part 12 of FIG. 2.

Referring to FIG. 3, the correlation analysis part 12 includes a correlation coefficient calculation section 100 for calculating correlation coefficients for two tags among the plurality of tags; a relevant tag determination section 200 for determining a relevant tag for each tag by comparing the correlation coefficient with a reference value; and an independent tag determination section 300 for determining one or more (i.e., at least one) among the plurality of tags as an independent tag based on the relevant tag.

The correlation coefficient calculation unit 100 calculates correlation coefficients for two tags among the plurality of tags. As described with respect to FIG. 1, the tag is an input of the plant abnormality prediction system and is an element that affects an abnormality diagnosis target. Specifically, the tag is an input of the correlation coefficient calculation unit 100 and is a component that has causation with the abnormality diagnosis target. A tag may include any element having causation with the abnormality diagnosis target. The abnormality diagnosis target is a target to be inspected and the above-described tag may also become the abnormality diagnosis target. That is, the tag represents a physical quantity accompanied with a plant operation, and the tags affect each other.

For example, when the abnormality diagnosis target is the speed of a motor, typically measured in revolutions per minute (rpm), the input current or voltage of the motor may be a tag. When the outlet temperature of a pump is the abnormality diagnosis target, the inlet temperature of the pump may be a tag.

The correlation coefficient calculation unit 100 calculates a correlation coefficient r based on Equation 1 with respect to tags x, y and a number of samples n.

$$r = \frac{\left(\sum_{i=1}^{n}(x_i - \bar{x})(y_i - \bar{y})\right) / (n-1)}{\sqrt{\left(\sum_{i=1}^{n}(x_i - \bar{x})^2\right) / (n-1)} \times \sqrt{\left(\sum_{i=1}^{n}(y_i - \bar{y})^2\right) / (n-1)}}$$

Equation 1

In the above equation, n denotes the number of samples; x and y denote tags; $\bar{x}$ denotes a sample mean for x; $\bar{y}$ denotes a sample mean for y; $x_i$ denotes the $i^{th}$ count of x; $y_i$ denotes the $i^{th}$ count of y; and r is a calculated correlation coefficient.

Tag x and tag y may be the same tag, whereby the correlation coefficient is 1, or may be different tags. The correlation coefficient calculation unit 100 calculates correlation coefficients for two tags, based on Equation 1, and calculates correlation coefficients for all tags.

Table 1 shows correlation coefficients calculated for ten tags by the correlation coefficient calculation unit 100, which calculates a correlation coefficient based on Equation 1. As can be seen, in each instance, the correlation coefficient is a value between −1 and +1.

TABLE 1

|  | Tag 1 | Tag 2 | Tag 3 | Tag 4 | Tag 5 | Tag 6 | Tag 7 | Tag 8 | Tag 9 | Tag 10 |
|---|---|---|---|---|---|---|---|---|---|---|
| Tag 1 | 1 | 0.999 | 0.9 | −0.999 | 0.6 | 0.8 | −0.1 | −0.3 | 0.4 | 0.7 |
| Tag 2 | 0.999 | 1 | 0.7 | 0.999 | 0.2 | −0.97 | 0.3 | 0.8 | 0.3 | −0.8 |
| Tag 3 | 0.9 | 0.7 | 1 | 0.8 | 0.1 | −0.9 | 0.1 | 0.6 | 0.2 | −0.7 |
| Tag 4 | −0.999 | 0.999 | 0.8 | 1 | 0.8 | 0.8 | 0.3 | 0.5 | −0.1 | 0.8 |
| Tag 5 | 0.6 | 0.2 | 0.1 | 0.8 | 1 | 0.7 | 0.4 | −0.8 | −0.4 | 0.9 |
| Tag 6 | 0.8 | −0.97 | −0.9 | 0.8 | 0.7 | 1 | 0.6 | 0.7 | 0.2 | −0.999 |
| Tag 7 | −0.1 | 0.3 | 0.1 | 0.3 | 0.4 | 0.6 | 1 | 0.6 | −0.1 | 0.9 |
| Tag 8 | −0.3 | 0.8 | 0.6 | 0.5 | −0.8 | 0.7 | 0.6 | 1 | 0.3 | 0.9 |
| Tag 9 | 0.4 | 0.3 | 0.2 | −0.1 | −0.4 | 0.2 | −0.1 | 0.3 | 1 | −0.5 |
| Tag 10 | 0.7 | −0.8 | −0.7 | 0.8 | 0.9 | −0.999 | 0.9 | 0.9 | −0.5 | 1 |

As described above, the relevant tag determination section 200 determines a relevant tag for each tag by comparing the correlation coefficient with a reference value. That is, the relevant tag determination section 200 determines the relevant tag based on the calculated correlation coefficient for each tag, and the relevant tag may be not present or may include one or more tags. Details in which the relevant tag determination section 200 determines the relevant tag will be described later.

Details of the independent tag determination unit 300 will be described later.

Figure 4:
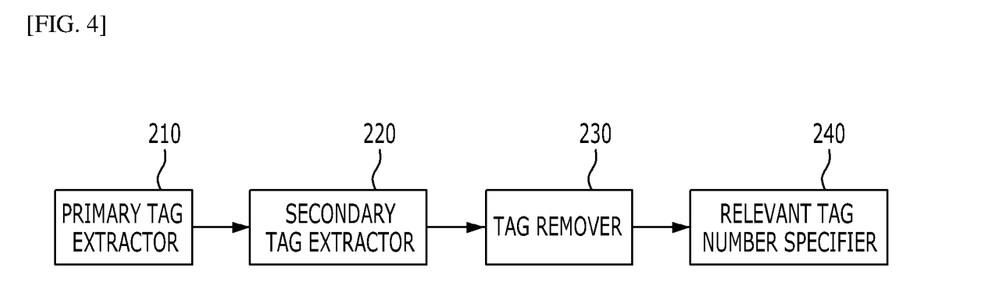
FIG. 4 is a block diagram of the relevant tag determination section of FIG. 3.

FIG. 4 illustrates a detailed configuration of the relevant tag determination section 200 of FIG. 3.

Referring to FIG. 4, the relevant tag determination section 200 includes a primary tag extractor 210 for extracting a primary tag for each tag. The primary tag is a tag wherein the absolute value of the correlation coefficient is less than or equal to (i.e., not greater than) a first upper limit and is greater than or equal to (i.e., not less than) a first lower limit. The first upper limit may be 1 or less, for example, and is preferably 1. The first lower limit may be 0.7 or more, for example, and is preferably 0.8.

The primary tags extracted for each tag, that is, as extracted by the primary tag extraction section 210, are shown in Table 2.

TABLE 2

| Tag | Primary Tag Nos. |
| --- | --- |
| Tag 1 | 2, 3, 4, 6, 10 |
| Tag 2 | 1, 3, 4, 6, 8, 10 |
| Tag 3 | 1, 2, 4, 6, 10 |
| Tag 4 | 1, 2, 3, 5, 6, 10 |
| Tag 5 | 4, 6, 8, 10 |
| Tag 6 | 1, 2, 3, 4, 5, 8, 10 |
| Tag 7 | 10 |
| Tag 8 | 2, 5, 6, 10 |
| Tag 9 | |
| Tag 10 | 1, 2, 3, 4, 5, 6, 7, 8 |

In Table 2, the numbers of the righthand column specify primary tags for each tag. For example, the primary tags for Tag 1 are tags 2, 3, 4, 6, and 10, and there is no primary tag for Tag 9.

In other words, the primary tag extraction section 210 performs a primary filtering based on the calculated correlation coefficient. The primary filtering means that the primary tag extraction section 210 extracts the tags having a certain degree of correlation for each tag.

The relevant tag determination section 200 further includes a secondary tag extractor 220 for extracting a secondary tag for each tag. The secondary tag is a tag wherein the absolute value of the correlation coefficient is less than or equal to (i.e., not greater than) a second upper limit and is greater than or equal to (i.e., not less than) a second lower limit. The second upper limit may be 1 or less, for example, and is preferably 1. The second lower limit may be 0.8 or more, for example, and is preferably 0.999.

The secondary tags extracted for each tag, that is, as extracted by the secondary tag extraction section 220, are shown in Table 3.

TABLE 3

| Tag | Secondary Tag Nos. |
| --- | --- |
| Tag 1 | 2, 4 |
| Tag 2 | 1, 4 |
| Tag 4 | 1, 2 |
| Tag 6 | 10 |
| Tag 10 | 6 |

In Table 3, the numbers of the righthand column specify the secondary tags for each tag. For example, the secondary tags for Tag 1 are tags 2 and 4, and the secondary tag for Tag 6 is tag 10. Thus, referring to the extracted secondary tags for each tag, it may be confirmed that the secondary tags are classified into one or more groups. That is, in the above example, one secondary tag group consists of tags 1, 2, and 4, and the other secondary tag group consists of tags 6 and 10.

As described above, while the first upper limit in the primary tag extractor 210 is equal to the second upper limit in the secondary tag extractor 220, the first lower limit is less (lower) than or equal to the second lower limit. That is, the secondary tag extractor 220 extracts tags having a higher correlation for each tag than does the primary tag extractor 210.

The relevant tag determination section 200 further includes a tag remover 230 for removing some tags from the extracted primary tags for each tag. Here, the removed tags include at least one tag among the secondary tags. The tag removal operation of the tag removal section 230 removes at least one tag among the secondary tags from the extracted primary tags, whereby a secondary tag having a very high degree of correlation may be removed from the primary tags having a certain degree of correlation.

In the tag remover 230, the tags to be removed include at least one secondary tag for each group when there are plural secondary tags classified into one or more groups.

The results achieved by the tag removal section 230, in which some tags are removed from the extracted primary tags for each tag, are shown in Table 4.

TABLE 4

| Tag | Primary Tag Nos. after tag removal |
| --- | --- |
| Tag 1 | 3, 6 |
| Tag 2 | 3, 6, 8 |
| Tag 3 | 1, 6 |
| Tag 4 | 1, 3, 5, 6 |
| Tag 5 | 4, 6, 8 |
| Tag 6 | 1, 3, 5, 8 |
| Tag 7 | 10 |
| Tag 8 | 2, 5, 6 |
| Tag 9 | |
| Tag 10 | 1, 3, 5, 7, 8 |

In Table 4, it may be confirmed that, for Tag 1, for example, the primary tags removed by an operation of the tag removal section 230 are tags 2, 4, and 10 among primary tags 2, 3, 4, 6, and 10 as shown in Table 2.

Meanwhile, as described in relation to Table 3, one secondary tag group may consist of tags 1, 2, and 4 and the other secondary tag group may consist of tags 6 and 10. Accordingly, in the example of Tag 1 per Table 4, it may be confirmed that the tags of the above-described one secondary tag group, namely, tags 2 and 4, have been removed from the primary tags for Tag 1, in which group the tag 1 naturally remains. In addition, it may be confirmed that tag 10, which is one among tags 6 and 10 (i.e., the tags of the above-described other secondary tag group), has also been removed from the primary tags for Tag 1.

In the tag remover 230, when there are plural secondary tags classified into one or more groups, the tags to be removed include at least one secondary tag for each group. Moreover, the tags to be removed may include only the remaining tags excluding itself in the secondary tag groups including itself for each tag.

In addition, the tags to be removed may include a tag having a low sequence number among the tags of the secondary tag groups that do not include itself for each tag.

The tags to be removed are not limited to these, and may include a tag having a high sequence number among the tags of the secondary tag groups that do not include itself for each tag. Herein, the tag indicated as having a high sequence number is a tag identified by a larger number, and the tag indicated as having a low sequence number is a tag identified by a smaller number in the above-described example.

The relevant tags determined by the relevant tag determination section 200 are a final set of tags in which some tags have been removed from the extracted primary tag for each tag. At this time, the tag having no the primary tag itself has no relevant tag. In the above-described example, Tag 9 has no primary tag, no secondary tag, and no relevant tag. For the tag having no relevant tag, when there are plural secondary tags classified into one or more groups, the relevant tag determination section 200 determines the remaining tags excluding at least one tag for each group as a relevant tag.

In the above-described example, the relevant tag of Tag 9 is not present. In this case, the relevant tag determination section 200 may determine tags 1, 3, 5, 6, 7, and 8 as the relevant tag of Tag 9 by excluding at least one tag for each secondary tag group.

Therefore, in the above-described example, the finally determined relevant tags for each tag are shown in Table 5.

TABLE 5

| Tag | Finally determined relevant tag Nos. |
|---|---|
| Tag 1 | 3, 6 |
| Tag 2 | 3, 6, 8 |
| Tag 3 | 1, 6 |
| Tag 4 | 1, 3, 5, 6 |
| Tag 5 | 4, 6, 8 |
| Tag 6 | 1, 3, 5, 8 |
| Tag 7 | 10 |
| Tag 8 | 2, 5, 6 |
| Tag 9 | 1, 3, 5, 6, 7, 8 |
| Tag 10 | 1, 3, 5, 7, 8 |

The relevant tag determination section 200 further includes a relevant tag number specifier 240 for determining a set of relevant tags that has had removed some tags from the extracted primary tags for each tag, and for specifying the number (count) of the relevant tags.

Based on the finally determined relevant tags for each tag as shown in Table 5 above, the number (count) of the relevant tags specified for each tag by the relevant tag number specifying section 240 is shown in Table 6.

TABLE 6

| Tag (count) | Finally determined relevant tag Nos. |
|---|---|
| Tag 1 (two) | 3, 6 |
| Tag 2 (three) | 3, 6, 8 |
| Tag 3 (two) | 1, 6 |
| Tag 4 (four) | 1, 3, 5, 6 |
| Tag 5 (three) | 4, 6, 8 |
| Tag 6 (four) | 1, 3, 5, 8 |
| Tag 7 (one) | 10 |
| Tag 8 (three) | 2, 5, 6 |
| Tag 9 (six) | 1, 3, 5, 6, 7, 8 |
| Tag 10 (five) | 1, 3, 5, 7, 8 |

Referring again to FIG. 3, the independent tag determination section 300 determines one or more among the plurality of tags as an independent tag based on the relevant tag. Specifically, when a count of the relevant tags of a specific tag is less than a specific percentage relative to the entire number of tags, the independent tag determination section 300 may determine the specific tag as an independent tag. Conversely, when the count is greater than or equal to (i.e., not less than) the specific percentage, the independent tag determination section 300 may determine the specific tag as a dependent tag.

A tag type determined for each tag by the independent tag determination unit 300 is shown in Table 7.

TABLE 7

| Tag | Tag type |
|---|---|
| Tag 1 | dependent |
| Tag 2 | dependent |
| Tag 3 | dependent |
| Tag 4 | dependent |
| Tag 5 | dependent |
| Tag 6 | dependent |
| Tag 7 | independent |
| Tag 8 | dependent |
| Tag 9 | independent |
| Tag 10 | dependent |

The independent tag determination section 300 determines a specific tag as an independent tag when the count of the relevant tags of the specific tag is less than a specific percentage relative to the entire number of tags (ten, in this example), and the specific percentage may be 20%, for example. Therefore, in the above-described example, when the count of the relevant tags is less than two, the specific tag may be determined as an independent tag. Here, Tag 7 having less than two relevant tags is an independent tag, and Tags 1, 2, 3, 4, 5, 6, 8, and 10 each having two or more relevant tags are dependent tags.

However, Tag 9 may be determined as an independent tag in the above-described example, even if it has two or more relevant tags, since Tag 9 is a tag having no primary tag. That is, when a tag has no primary tag extracted by the primary tag extractor 210, the independent tag determination section 300 determines such a tag as an independent tag.

Figure 5:
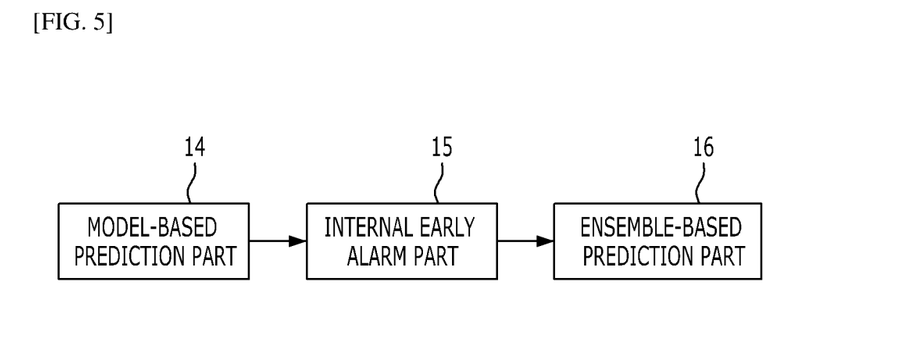
FIG. 5 is a block diagram of the prediction unit of FIG. 1.

FIG. 5 illustrates a detailed configuration of the prediction unit 20 of FIG. 1.

Referring to FIG. 5, the prediction unit 20 includes a model-based prediction part 14 for calculating estimated data for each tag based on actually measured data for the plurality of tags and the relationship equation; an internal early alarm part 15 for outputting an alarm when the residual of the actually measured data and the estimated data for each tag is greater than or equal to a reference value; and an ensemble-based prediction part 16 for re-calculating the estimated data for each tag based on the alarm for each tag.

The model-based prediction part 14 uses the relationship equation obtained from that the modeling part 13 of FIG. 2 to calculate the estimated data for each tag. That is, the estimated data is calculated by the model-based prediction part 14 based on and the relationship equation and the actually measured data for the plurality of tags.

As described above, the relationship equation calculated by the modeling part 13 may be $y = a_1 x_1 + a_2 x_2 + \ldots + a_n x_n + a_m$.

In the above equation, y denotes an arbitrary tag, $x_1$ to $x_n$ denote tags, $a_1$ to $a_n$ denote coefficients, and $a_m$ denotes a constant. Thus, the modeling part 13 generates the relationship equation in which any one tag is a weighted sum of the other tags. However, when $x_1$ to $x_n$ are values of the tags for the time point t, the arbitrary tag y has a tag value of t+1. That is, y, which is the estimated data for each tag, is calculated through $x_1$ to $x_n$, which are the actually measured data for the plurality of tags. Here, the actually measured data are past and/or current data of the tag.

The internal early alarm part 15 outputs an alarm based on a comparison of the reference value and the residual of the actually measured data and the estimated data for each tag. The actually measured data is a value of the tag collected at the current time point, and as described above, the estimated data are calculated by the model-based prediction part 14. Thus, the internal early alarm part 15 outputs an alarm when a difference between the actually measured data and the estimated data for each tag is greater than or equal to the reference value, and otherwise outputs no alarm, that is, when the difference is less than the reference value.

A detailed description of the ensemble-based prediction part 16 will be made with reference to FIG. 6.

Figure 6:
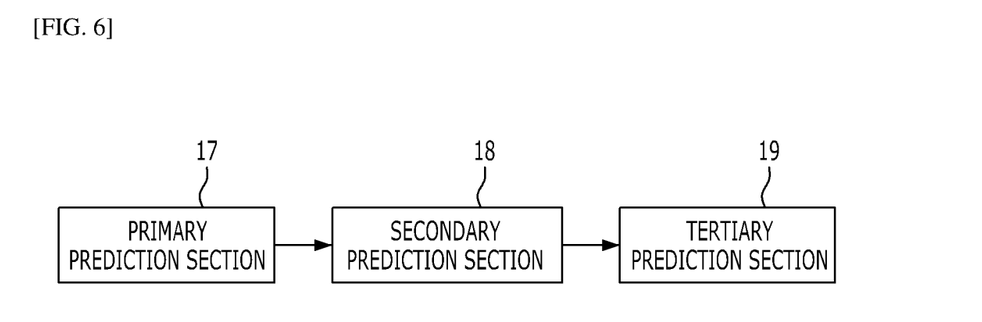
FIG. 6 is a block diagram of the ensemble-based prediction part of FIG. 5.

FIG. 6 illustrates a detailed configuration of the ensemble-based prediction part 16 of FIG. 5. The ensemble-based prediction part 16 includes a primary prediction section 17 for outputting a k-NN-based predicted value when the tag is an independent tag by using as an input the estimated data for each tag output by the model-based prediction part 14. A detailed description for a method for determining an independent tag has been made above.

For reference, a k-nearest neighbors (k-NN) algorithm is an algorithm for estimating a value by measuring the similarity with the most similar K data among the existing data when classifying new data. Methods for measuring the similarity between new data and existing data include methods of Euclidean distance, correlation coefficient, cosine similarity, Tanimoto score, etc.

The ensemble-based prediction part 16 further includes a secondary prediction section 18 for outputting a k-NN-based predicted value when the tag is a dependent tag and is a tag in which an alarm has been output by using as an input the estimated data for each tag output by the model-based prediction part 14. As a result, the ensemble-based prediction part 16 outputs the k-NN-based predicted value of the tag when the tag is an independent tag or when the tag is a dependent tag and is a tag in which an alarm has been output.

The ensemble-based prediction part 16 further includes a tertiary prediction section 19 for outputting a bagging or boosting-based predicted value when the tag is a dependent tag and is a tag in which no alarm has been output, by using as an input the estimated data for each tag output by the model-based prediction part 14.

Bagging, also called bootstrap aggregating, is an algorithm that performs a bootstrap sampling for original training data to generate the number of training data. This data is used to generate multiple models using a single learning algorithm. The prediction for the model is summed by using either a vote (for classification) or an average (for numerical prediction).

Meanwhile, a boosting algorithm uses an ensemble of the trained model for the re-sampled data and votes to determine a final prediction. The data re-sampled in the boosting are specially constructed to generate a complementary learning device, and the vote is weighted based on performance of each model rather than giving the same weight.

Figure 7:
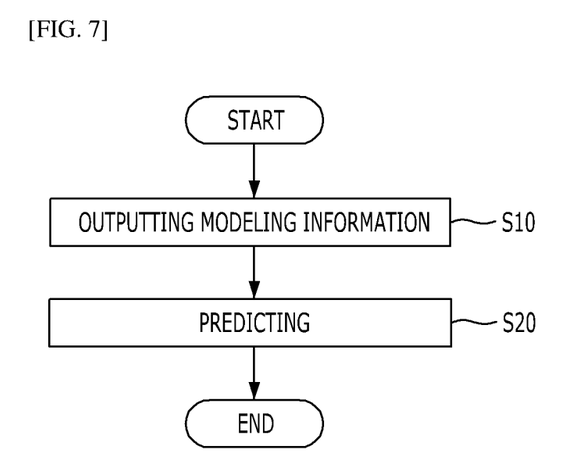
FIG. 7 is a flowchart of a plant abnormality prediction method according to an embodiment of the present disclosure.
Figure 8:
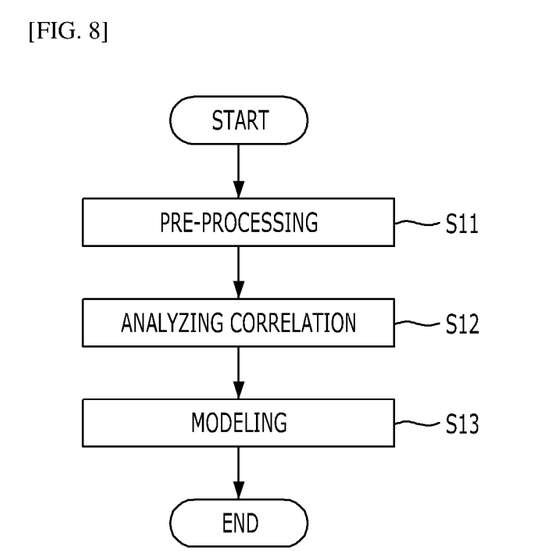
FIG. 8 is a flowchart detailing the outputting modeling information of FIG. 7.

FIG. 7 illustrates a plant abnormality prediction method according to an embodiment of the present disclosure, including a step for outputting modeling information S10 that is detailed in FIG. 8.

Referring to FIG. 7, the plant abnormality prediction system includes outputting modeling information that receives (inputs) past data for a plurality of tags to generate a relationship equation between the tags in a step S10; and predicting that calculates estimated data for the tag based on the relationship equation in a step S20. Referring to FIG. 8, the outputting the modeling information S10 of FIG. 7 includes pre-processing the received past data for the plurality of tags in a step S11; analyzing a correlation that receives the pre-processed data for each tag to determine an independent tag among the plurality of tags based on correlation coefficients for any two tags in a step S12; and modeling that generates the relationship equation between the tags by using as an input the outputs of the pre-processing (S11) and the analyzing the correlation (S12) in a step S13.

The step S10 receives the past data for the plurality of tags to generate the relationship equation between the tags. Here, the tags are targets of the plant abnormality prediction and are also factors necessary for the prediction of the target. In practice, the tag is a variable that can be measured. For example, in the case of a plant, measurable variables may include one or more of temperature, humidity, a turbine's rotating speed, and steam pressure. Values of the tags vary over time, and any one tag may affect another tag.

The past data for the plurality of tags is a value of the tag at a time point before a current time point. The step S10 generates the relationship equation between the tags based on the past data for the plurality of tags.

The step S20 calculates estimated data for the tag based on the relationship equation. Based on the relationship equation calculated by the step S10, the step S20 calculates the estimated data for the tag. The estimated data for the tag is a value of the tag at a time point after the current time point. That is, the estimated data for the tag is a predicted value of the tag.

The step S11 of the outputting the modeling information (S10) pre-processes the input past data for the plurality of tags. That is, the step S11 pre-processes, in real time, the value of a tag as the tag value varies over time. The pre-processing is to purify data and to remove noise included in the data.

The step S12 receives the pre-processed data for each tag to determine an independent tag among the plurality of tags based on correlation coefficients for any two tags. A detailed procedure of determining the independent tag by the analyzing the step S12 will be described later.

The step S13 uses the outputs of the pre-processing (S11) and the correlation analysis (S12) to generate a relationship equation between the tags. The below example of the relationship equation may be obtained by the step S13.

$$y_{(k+m)} = a_1 x_{1(k)} + a_2 x_{2(k)} + \ldots + a_n x_{n(k)} + a_m$$

Here, y denotes an arbitrary tag, $x_1$ to $x_n$ denote tag values at a time point k, $a_1$ to $a_n$ denote coefficients, and $a_m$ denotes a constant. That is, the step S13 generates the relationship equation in which any one tag is a weighted sum of the other tags. Since each of $x_1$ to $x_n$ is value of the tag for the time point k, the arbitrary tag y has a tag value of a time point k+m, where m is a progressing time factor equal to zero or more.

The plant abnormality prediction method determines the relevant tag for each tag and, for each tag, determines whether the tag is an independent tag or a dependent tag. Here, the relevant tag for any one tag is an input tag for predicting the any one tag. The plant abnormality prediction method may perform k-NN-based prediction, as an example, by using as an input the relevant tag for the tag determined as an independent tag. In addition, the plant abnormality prediction method may perform k-NN-based prediction, MLRM-based prediction, or ensemble-based prediction by using as an input the relevant tag for the tag determined as the dependent tag.

In order to diagnose the abnormality of the specific tag, an operator unfamiliar with the plant system may set as an input a tag that is not helpful for the abnormality prediction of the specific tag. However, even if tags unrelated to the tag that is an abnormality prediction target are input, the plant abnormality prediction system extracts the relevant tag that is helpful for the abnormality prediction of the tag for each tag according to the above-described procedure, such that the unrelated tags are naturally excluded from the relevant tag.

That is, according to the plant abnormality prediction system, even if the tags are randomly input, the tags having causation with each other are grouped to set a relationship equation between the grouped tags, such that the tag may be input without understanding the plant system.

Figure 9:
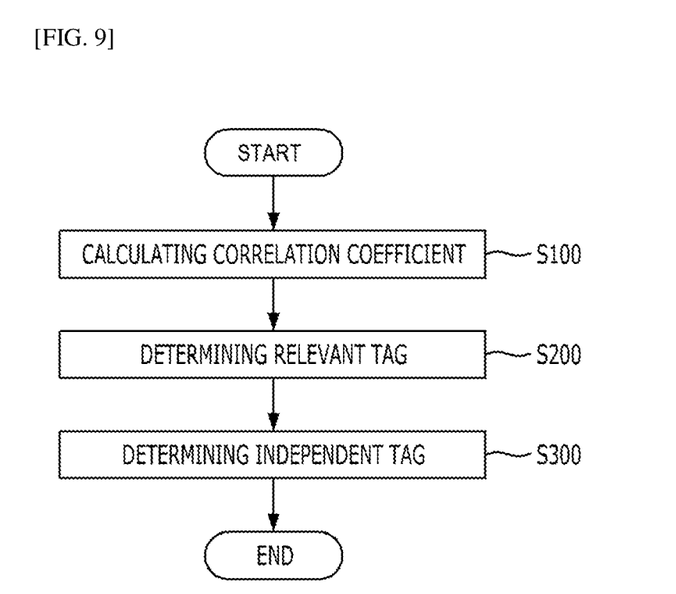
FIG. 9 is a flowchart detailing the analyzing correlation of FIG. 8.

FIG. 9 details the analyzing the correlation (S12) of FIG. 8.

Referring to FIG. 9, the step S12 of FIG. 8 includes calculating a correlation coefficient that calculates correlation coefficients for two tags among the plurality of tags in a step S100; determining a relevant tag that determines a relevant tag for each tag by comparing the correlation coefficient with a reference value in a step S200; and determining an independent tag that determines one or more among the plurality of tags as an independent tag based on the relevant tag in a step S300.

The step S100 calculates correlation coefficients for two tags among the plurality of tags. As described with respect to FIG. 1, the tag is an input of the plant abnormality prediction method and is an element that affects the abnormality diagnosis target. Specifically, the tag is an input of the step S100 and is a component having causation with the abnormality diagnosis target. A tag may include any element having causation with the abnormality diagnosis target. The abnormality diagnosis target is a target to be inspected and the above-described tag may also become the abnormality diagnosis target. That is, the tag represents a physical quantity accompanied with a plant operation, and the tags affect each other.

The step S100 calculates a correlation coefficient r based on the above Equation 1 with respect to tags x, y and a number of samples n. Here, tag x and tag y may be the same tag, whereby the correlation coefficient is 1, or may be different tags, and the step S100 calculates correlation coefficients for two tags, based on the above-described Equation 1, and calculates correlation coefficients for all tags. The correlation coefficient may be a value between −1 and +1, as shown in the above Table 1.

The step S200 determines a relevant tag for each tag by comparing the correlation coefficient with the reference value. That is, the step S200 determines the relevant tag based on the calculated correlation coefficient for each tag, and the relevant tag may be not present or may include one or more tags. A detailed description of determining the relevant tag by the step S200 will be made later.

The step S300 determines one or more among the plurality of tags as an independent tag based on the relevant tag. A detailed description of the step S300 will be made later.

Figure 10:
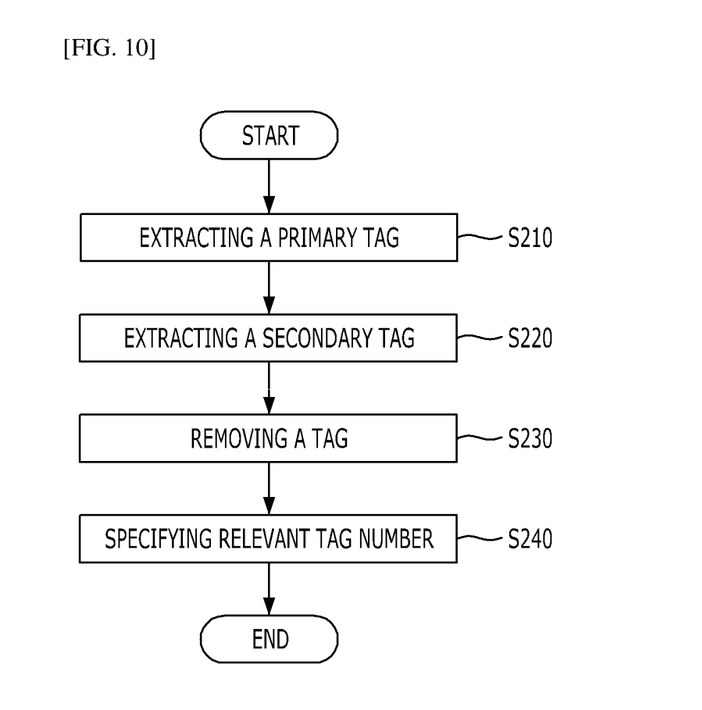
FIG. 10 is a flowchart detailing the determining relevant tag of FIG. 9.

FIG. 10 details the determining the relevant tag (S200) of FIG. 9.

Referring to FIG. 10, the step S200 of FIG. 9 includes extracting a primary tag for each tag in a step S210. The primary tag is a tag wherein the absolute value of the correlation coefficient is less than or equal to (i.e., not greater than) a first upper limit and is greater than or equal to (i.e., not less than) a first lower limit. The first upper limit may be 1 or less, for example, and is preferably 1. The first lower limit may be 0.7 or more, for example, and is preferably 0.8. The primary tags extracted for each tag, that is, as extracted in the step S210, are shown in the above Table 2.

In other words, the step S210 performs a primary filtering based on the calculated correlation coefficient. The primary filtering means that the extracting of the primary tag, as performed in the step S210, extracts the tags having a certain degree of correlation for each tag.

The step S200 further includes extracting a secondary tag in a step S220. As described with respect to FIG. 4, the secondary tag is a tag wherein the absolute value of the correlation coefficient is less than or equal to (i.e., not greater than) a second upper limit and is greater than or equal to (i.e., not less than) a second lower limit. The second upper limit may be 1 or less, for example, and is preferably 1. The second lower limit may be 0.8 or more, for example, and is preferably 0.999. The secondary tags extracted for each tag, that is, as extracted in the step S220, are shown in the above Table 3.

As described above, while the first upper limit of the step S210 is equal to the second upper limit of the step S220, the first lower limit is less (lower) than or equal to the second lower limit. That is, the step S220 extracts tags having a higher correlation for each tag than does the step S210.

The step S200 further includes removing a tag in a step S230, whereby some tags are removed from the extracted primary tags for each tag, the removed tags including at least one tag among the secondary tags. The step S230 removes at least one tag among the secondary tags from the extracted primary tags, whereby a secondary tag having a very high degree of correlation may be removed from the primary tags having a certain degree of correlation. The tags to be removed in the step S230 include at least one secondary tag for each group when there are plural secondary tags classified into one or more groups.

The results achieved by the step S230, in which some tags are removed from the extracted primary tags for each tag, are shown in the above Table 4.

In the step S230, when there are plural secondary tags classified into one or more groups, the tags to be removed include at least one secondary tag for each group. Moreover, the tags to be removed may include only the remaining tags excluding itself in the secondary tag groups including itself for each tag. As described with respect to FIG. 4, the tags to be removed may include a tag having a low sequence number among the tags of the secondary tag groups that do not include itself for each tag. The tags to be removed are not limited to these, and may include a tag having a high sequence number among the tags of the secondary tag groups that do not include itself for each tag.

The relevant tags determined in the step S200 are a final set of tags in which some tags have been removed from the extracted primary tag for each tag. At this time, the tag having no the primary tag itself has no relevant tag. In the above-described example, Tag 9 has no primary tag, no secondary tag, and no relevant tag. For the tag having no relevant tag, when there are plural secondary tags classified into one or more groups, the step S200 determines the remaining tags excluding at least one tag for each group as a relevant tag. In the above-described example, the relevant tag of Tag 9 is not present. In this case, the step S200 may determine tags 1, 3, 5, 6, 7, and 8 as the relevant tag of Tag 9 by excluding at least one tag for each secondary tag group.

Therefore, in the above-described example, the finally determined relevant tags for each tag are shown in the above Table 5.

The step S200 further includes specifying a relevant tag number in a step S240, which determines a set of relevant tags that has had removed some tags from the extracted primary tags for each tag, and that specifies the number (count) of the relevant tags.

Based on the finally determined relevant tags for each tag as shown in Table 5 above, the number (count) of the relevant tags specified for each tag in the step S240 is shown in the above Table 6.

Referring again to FIG. 9, the step S300 determines one or more among the plurality of tags as an independent tag based on the relevant tag. Specifically, when a count of the relevant tags of a specific tag is less than a specific percentage relative to the entire number of tags, the step S300 may determine the specific tag as an independent tag. Conversely, when the count is greater than or equal to (i.e., not less than) the specific percentage, the step S300 may determine the specific tag as a dependent tag.

A tag type determined for each tag by the step S300 is shown in the above Table 7.

The step S300 determines a specific tag as an independent tag when the count of the relevant tags of the specific tag is less than a specific percentage relative to the entire number of tags (ten, in this example), and the specific percentage may be 20%, for example. Therefore, in the above-described example, when the count of the relevant tags is less than two, the specific tag may be determined as an independent tag. Here, Tag 7 having less than two relevant tags is an independent tag, and Tags 1, 2, 3, 4, 5, 6, 8, and 10 each having two or more relevant tags are dependent tags.

However, as described with respect to FIG. 3, Tag 9 may be determined as an independent tag in the above-described example, even if it has two or more relevant tags, since Tag 9 is a tag having no primary tag. That is, when a tag has no primary tag extracted in the step S210, the step S300 determines such a tag as an independent tag.

As a result, the plant abnormality prediction method determines a relevant tag for each tag, and determines whether it is an independent tag or a dependent tag for each tag. Here, the relevant tag for any one tag is an input tag for predicting the any one tag. At this time, the plant abnormality prediction method performs k-NN-based prediction by using as an input the relevant tag for the tag determined as the independent tag. In addition, the plant abnormality prediction method performs k-NN-based prediction, MLRM-based prediction, or ensemble-based prediction by using as an input the relevant tag for the tag determined as the dependent tag.

Figure 11:
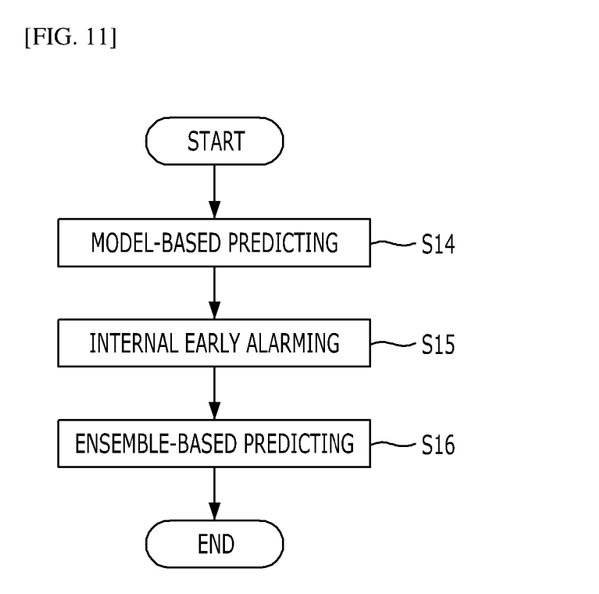
FIG. 11 is a flowchart detailing the predicting of FIG. 7.

FIG. 11 details the predicting (S20) of FIG. 7.

Referring to FIG. 11, the step S20 of FIG. 7 includes model-based predicting in a step S14, which calculates the estimated data for each tag based on the relationship equation and the actually measured data for the plurality of tags; internal early alarming in a step S15, which outputs an alarm when the residual of the actually measured data and the estimated data for each tag is greater than or equal to a reference value; and ensemble-based predicting in a step S16, which re-calculates the estimated data for each tag based on the alarm for each tag.

The step S14 calculates the estimated data for each tag based on the relationship equation and the actually measured data for the plurality of tags. As described above, the relationship equation generated by the modeling S13 may be $y = a_1 x_1 + a_2 x_2 + \ldots + a_n x_n + a_m$. Here, y denotes an arbitrary tag, $x_1$ to $x_n$ denote tags, $a_1$ to $a_n$ denote coefficients, and $a_m$ denotes a constant. Thus, the modeling part 13 generates the relationship equation in which any one tag is a weighted sum of the other tags. However, when $x_1$ to $x_n$ are values of the tags for the time point t, the arbitrary tag y has a tag value of t+1. That is, y, which is the estimated data for each tag, is calculated through $x_1$ to $x_n$, which are the actually measured data for the plurality of tags. Here, the actually measured data are past and/or current data of the tag.

The step S15 outputs an alarm based on a comparison of the reference value and the residual of the actually measured data and the estimated data for each tag. The actually measured data is a value of the tag collected at the current time point, and as described above, the estimated data are calculated by the step S14. Thus, the step S15 outputs an alarm when a difference between the actually measured data and the estimated data for each tag is greater than or equal to the reference value, and otherwise outputs no alarm, that is, when the difference is less than the reference value.

A detailed description of the step S16 will be made with reference to FIG. 12.

Figure 12:
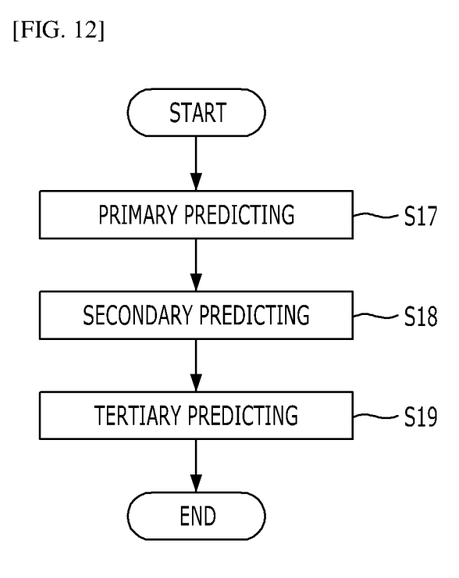
FIG. 12 is a flowchart detailing the ensemble-based predicting of FIG. 11.

FIG. 12 details the ensemble-based predicting (S16) of FIG. 11. The step S16 may include primary predicting in a step S17, which outputs a k-NN-based predicted value when the tag is the independent tag by using as an input the estimated data for each tag output by the model-based predicting (S14).

The step S17 outputs the k-NN-based predicted value when the tag is the independent tag by using as an input the estimated data for each tag output by the model-based predicting (S14). A detailed description for the method for determining an independent tag has been made above.

The step S16 of FIG. 11 further includes secondary predicting in a step S18, which outputs the k-NN-based predicted value when the tag is the dependent tag and is a tag in which an alarm has been output by using as an input the estimated data for each tag output by the model-based predicting (S14). As a result, the ensemble-based predicting (S16) outputs the k-NN-based predicted value for the tag when the tag is the independent tag, or when the tag is the dependent tag and is a tag in which an alarm has been output.

The step S16 further includes tertiary predicting in a step S19, which outputs a bagging or boosting-based predicted value when the tag is the dependent tag and is a tag in which an alarm has not been output by using as an input the estimated data for each tag output by the model-based predicting (S14).

As described above, those skilled in the art to which the present disclosure pertains will appreciate that the present disclosure may be implemented in other detailed forms without changing the technical spirit or essential characteristic of the present disclosure. Accordingly, it is to be understood that the aforementioned embodiments are only illustrative, but are not limiting or restrictive. Furthermore, the flowcharts illustrated in the drawings are merely sequential order illustrated to achieve the most preferred results in implementing the present disclosure, and other additional steps may be provided or some of the steps may be deleted.

Technological characteristics described in this specification and an implementation for executing the technological characteristics may be implemented using a digital electronic circuit, may be implemented using computer software, firmware or hardware including the structure described in this specification and structural equivalents thereof, or may be implemented using a combination of one or more among them. Furthermore, the implementation for executing the technological characteristics described in this specification may be implemented using a computer program product, that is, a module regarding computer program instructions encoded on a kind of program storage media in order to control the operation of a processing system or for execution by the processing system.

As described above, the detailed terms proposed in this specification are not intended to limit the present disclosure. Accordingly, although the present disclosure has been described in detail with reference to the aforementioned embodiments, those skilled in the art to which the present disclosure pertains may reconstruct, change and modify the embodiments without departing from the scope of the present disclosure.

The scope of the present disclosure is defined by the following appended claims rather than the detailed description, and the present disclosure should be construed as covering all modifications or variations derived from the meaning and scope of the appended claims and their equivalents.

What is claimed is:

1. A computer hardware system for predicting plant abnormality, the system comprising a processing system and a program storage media including computer program instructions, wherein the computer program instructions are executed by the processing system, the computer program instructions comprise:
   (a) receiving, by the processing system, a plurality of past tags and creating a plurality of tags by removing noise from the plurality of past tags;
   (b) calculating, by the processing system, a correlation coefficient for any two tags among the plurality of tags;
   (c) determining, by the processing system, one or more relevant tags for each tag based on correlation coefficients for any two tags among the plurality of tags, wherein the one or more relevant tags for each tag is an input tag for predicting each tag and the determining of the one or more relevant tags comprises assigning a plurality of primary tags and a plurality of secondary tags to each tag and removing at least one tag among the plurality of secondary tags from the plurality of primary tags, wherein the correlation between each of the plurality of secondary tags and each tag is greater than the correlation between each of the plurality of primary tags and each tag;
   (d) classifying, by the processing system, a tag type of each tag into an independent tag or a dependent tag, wherein a specific tag is determined to be the independent tag when a number of the one or more relevant tags of the specific tag is less than a specific percentage relative to the entire number of tags, and is determined to be the dependent tag when the number of the one or more relevant tags is greater than or equal to the specific percentage, wherein the specific tag without any primary tag is determined to be the independent tag;
   (e) training, by the processing system, a regression model using the plurality of tags and the one or more relevant tags;
   (f) generating, by the processing system, an estimated tag using the regression model and the one or more relevant tags;
   (g) outputting, by the processing system, an alarm when a residual of a measured tag and the estimated tag is greater than or equal to a threshold value; and
   (h) re-calculating, by the processing system, the estimated tag using a k-nearest neighbors (k-NN) or boosting method, wherein a selection of the method is determined based on the alarm for each tag and the tag type.

2. The system of claim 1, wherein the determining of the one or more relevant tags comprises:
   (a) selecting one tag from the plurality of tags, wherein the selecting of the one tag is repeated for all of the plurality of tags;
   (b) calculating an absolute value of the correlation coefficient between the selected tag and each of the rest of the plurality of tags; and
   (c) assigning each of the rest of the plurality of tags as a primary tag of the selected tag if the absolute value is less than or equal to a first upper limit and is greater than or equal to a first lower limit.

3. The system of claim 2, wherein the determining of the one or more relevant tags comprises:
   (a) selecting one tag from the plurality of tags, wherein the selecting of the one tag is repeated for all of the plurality of tags;
   (b) calculating an absolute value of the correlation coefficient between the selected tag and each of the rest of the plurality of tags; and
   (c) assigning each of the rest of the plurality of tags as a secondary tag of the selected tag if the absolute value is less than or equal to a second upper limit and is greater than or equal to a second lower limit.

4. The system of claim 3, wherein the determining of the one or more relevant tags comprises:
   (a) removing at least one tag among the secondary tags, wherein the at least one tag to be removed includes at least one secondary tag for each group when plural secondary tags are classified into one or more groups; and
   (b) assigning all tags except at least one tag for each secondary tag group as the one or more relevant tags to a tag without any relevant tags.

5. The system of claim 4, wherein the determining of the one or more relevant tags comprises: determining a set of relevant tags wherein the set is all remaining primary tags after removing the at least one primary tag.

6. The system of claim 5, wherein the classifying of the tag type of each tag comprises:
   (a) counting a number of relevant tags for each tag and a total number of tags; and
   (b) classifying each tag into an independent tag or a dependent tag based on the ratio between the number of the relevant tags and the total number of tags.

7. The system of claim 1, wherein the re-calculating of the estimated tag comprises:
   re-calculating an updated estimated value of a tag using a k-NN method if the tag is an independent tag, wherein an input to the k-NN method is an estimated tag generated from the regression model.

8. The system of claim 7, wherein the re-calculating the estimated tag comprises:
   re-calculating an updated estimated value of a tag using a k-NN method if the tag is a dependent tag and an alarm has been outputted, wherein an input to the k-NN method is an estimated tag generated from the regression model.

9. The system of claim 8, wherein the re-calculating the estimated tag comprises:
   re-calculating an updated estimated value of a tag using a boosting method if the tag is a dependent tag and an alarm has not been outputted, wherein an input to the boosting method is an estimated tag generated from the regression model.

10. A method for predicting plant abnormality, the method comprising:
(a) receiving a plurality of past tags and creating a plurality of tags by removing noise from the plurality of past tags;
(b) calculating a correlation coefficient for any two tags among the plurality of tags;
(c) determining one or more relevant tags for each tag based on correlation coefficients for any two tags among the plurality of tags, wherein the one or more relevant tags for each tag is an input tag for predicting each tag and the determining of the one or more relevant tags comprises assigning a plurality of primary tags and a plurality of secondary tags to each tag and removing at least one tag among the plurality of secondary tags from the plurality of primary tags, wherein the correlation between each of the plurality of secondary tags and each tag is greater than the correlation between each of the plurality of primary tags and each tag;
(d) classifying a tag type of each tag into an independent tag or a dependent tag, wherein a specific tag is determined to be the independent tag when a number of the one or more relevant tags of the specific tag is less than a specific percentage relative to the entire number of tags, and is determined to be the dependent tag when the number of the one or more relevant tags is greater than or equal to the specific percentage, wherein the specific tag without any primary tag is determined to be the independent tag;
(e) training a regression model using the plurality of tags and the one or more relevant tags;
(f) generating an estimated tag using the regression model and the one or more relevant tags;
(h) outputting an alarm when a residual of a measured tag and the estimated tag is greater than or equal to a threshold value; and
(g) re-calculating the estimated tag using a k-nearest neighbors (k-NN) or boosting method, wherein a selection of the method is determined based on the alarm for each tag and the tag type.

11. The system of claim 10, wherein the determining of the one or more relevant tags comprises:
(a) selecting one tag from the plurality of tags, wherein the selecting of the one tag is repeated for all of the plurality of tags;
(b) calculating an absolute value of the correlation coefficient between the selected tag and each of the rest of the plurality of tags; and
(c) assigning each of the rest of the plurality of tags as a primary tag of the selected tag if the absolute value is less than or equal to a first upper limit and is greater than or equal to a first lower limit.

12. The system of claim 11, wherein the determining of the one or more relevant tags comprises:
(a) selecting one tag from the plurality of tags, wherein the selecting of the one tag is repeated for all of the plurality of tags;
(b) calculating an absolute value of the correlation coefficient between the selected tag and each of the rest of the plurality of tags; and
(c) assigning each of the rest of the plurality of tags as a secondary tag of the selected tag if the absolute value is less than or equal to a second upper limit and is greater than or equal to a second lower limit.

13. The system of claim 12, wherein the determining of the one or more relevant tags comprises:
(a) removing at least one tag among the secondary tags, wherein the at least one tag to be removed includes at least one secondary tag for each group when plural secondary tags are classified into one or more groups; and
(b) assigning all tags except at least one tag for each secondary tag group as the one or more relevant tags to a tag without any relevant tags.

14. The system of claim 13, wherein the determining of the one or more relevant tags comprises: determining a set of relevant tags wherein the set is all remaining primary tags after removing the at least one primary tag.

15. The system of claim 14, wherein the classifying of the tag type of each tag comprises:
(a) counting a number of relevant tags for each tag and a total number of tags; and
(b) classifying each tag into an independent tag or a dependent tag based on the ratio between the number of the relevant tags and the total number of tags.

16. The system of claim 10, wherein the re-calculating of the estimated tag comprises:
re-calculating an updated estimated value of a tag using a k-NN method if the tag is an independent tag, wherein an input to the k-NN method is an estimated tag generated from the regression model.

17. The system of claim 16, wherein the re-calculating the estimated tag comprises:
re-calculating an updated estimated value of a tag using a k-NN method if the tag is a dependent tag and an alarm has been outputted, wherein an input to the k-NN method is an estimated tag generated from the regression model.

18. The system of claim 17, wherein the re-calculating the estimated tag comprises:
re-calculating an updated estimated value of a tag using a boosting method if the tag is a dependent tag and an alarm has not been outputted, wherein an input to the boosting method is an estimated tag generated from the regression model.

* * * * *